(12) United States Patent
Moia et al.

(10) Patent No.: US 7,201,948 B2
(45) Date of Patent: Apr. 10, 2007

(54) OPTICAL DEVICE AND METHOD FOR MANUFACTURING SAME

(75) Inventors: Franco Moia, Frenkendorf (CH); Graham A. Johnson, Bottmingen (CH)

(73) Assignee: Rolic AG, Zug (SE)

( * ) Notice: Subject to any disclaimer, the term of this patent is extended or adjusted under 35 U.S.C. 154(b) by 6 days.

(21) Appl. No.: 10/470,330

(22) PCT Filed: Jan. 28, 2002

(86) PCT No.: PCT/CH02/00043

§ 371 (c)(1),
(2), (4) Date: Dec. 9, 2003

(87) PCT Pub. No.: WO02/061470

PCT Pub. Date: Aug. 8, 2002

(65) Prior Publication Data

US 2005/0072959 A1    Apr. 7, 2005

(30) Foreign Application Priority Data

Jan. 29, 2001    (EP)    ................... 01810082

(51) Int. Cl.
*C09K 19/00* (2006.01)
*C09K 19/38* (2006.01)
*G02F 1/1333* (2006.01)
(52) U.S. Cl. .......... 428/1.1; 428/1.2; 428/1.3; 428/1.31; 349/86; 349/94
(58) Field of Classification Search ........... 428/1.1, 428/1.2, 411.1, 480, 482, 500, 515, 1.3, 1.31; 427/162, 333; 283/72, 94, 117; 349/86, 349/94
See application file for complete search history.

(56) References Cited

U.S. PATENT DOCUMENTS

| 4,002,404 | A  |   | 1/1977  | Dir |
|-----------|----|---|---------|-----|
| 5,172,131 | A  | * | 12/1992 | Crystal et al. .............. 347/217 |
| 5,773,178 | A  |   | 6/1998  | Shiota et al. |
| 5,796,458 | A  |   | 8/1998  | Koike et al. |
| 5,798,147 | A  |   | 8/1998  | Beck et al. |
| 6,183,018 | B1 | * | 2/2001  | Braun et al. ................ 283/114 |
| 6,393,980 | B2 | * | 5/2002  | Simons ................. 101/128.21 |
| 6,650,387 | B1 | * | 11/2003 | Asao et al. ................ 349/133 |

(Continued)

FOREIGN PATENT DOCUMENTS

EP    0 689 065 A1    12/1995

(Continued)

OTHER PUBLICATIONS

Schadt, M. et al., "Photo-Induced Alignment and Patterning of Hybrid Liquid Crystalline Polymer Films on Single Substrates", Jpn. J. Appl. Phys, vol. 34, Part 2, No. 6B, pp. L-764-L767, (Jun. 15, 1995).

(Continued)

*Primary Examiner*—Shean C. Wu
(74) *Attorney, Agent, or Firm*—Sughrue Mion, PLLC

(57) ABSTRACT

A method for manufacturing a structured optical device (1) starts with a substrate (2), on which is coated an alignment layer (3) and a liquid crystal polymer network layer (4). One of these layers can be created as a coating using a conventional technique. The other layer, either in a first step the alignment layer or in a second step the liquid crystal polymer network layer, is jet printed. The invention advantageously enables the making of a patterned liquid crystal polymer network which can be personalized upon manufacturing.

26 Claims, 8 Drawing Sheets

U.S. PATENT DOCUMENTS 6,671,031 B1 * 12/2003 Nishimura .................. 349/201
6,677,042 B2 * 1/2004 Kuntz et al. ................. 428/402
6,740,472 B2 * 5/2004 Karasev ..................... 430/312

FOREIGN PATENT DOCUMENTS

| EP | 0 880 052 A2 | | 11/1998 |
|---|---|---|---|
| EP | 1 028 359 | * | 8/1999 |
| EP | 1 321 450 | * | 9/2001 |
| GB | 2331271 | * | 5/1999 |
| JP | 2000-289000 | * | 10/2000 |
| WO | WO 98/44382 | | 10/1998 |
| WO | WO 99/19900 | | 4/1999 |
| WO | WO 99/64924 | | 12/1999 |

OTHER PUBLICATIONS

Moia, F. et al., "Optical LPP/LCP Devices: A New Generation of Optical Security Elements", Optical Security and Counterfeit Deterrence Techniques III:, Proceedings of SPIE (van Renesse, et al., editors), San Jose, California, vol. 3973, 2000, pp. 196-203, (Jan. 27-28, 2000).

* cited by examiner

OPTICAL DEVICE AND METHOD FOR MANUFACTURING SAME

CROSS REFERENCE TO RELATED APPLICATIONS

This application is a national stage filing under 35 U.S.C. § 371 of International Application No. PCT/CH 02/00043, filed on Jan. 28, 2002, the content of which is incorporated herein by reference, and claims priority to European Patent Application No. 01 810 082.6, filed on Jan. 29, 2001.

The invention relates to a method for manufacturing a liquid crystal polymer network and an optical device manufactured according to the method.

Such optical devices are usually based on birefringent layers formed from cross-linked Liquid Crystal Polymers (LCP). Generally, all kind of LCP materials are possible, for instance apart from nematic materials also materials with different mesophases (such as cholesteric LCPs) or containing guest molecules (such as dichroic LCPs). For the alignment of the LCP prior and during the cross-linking, alignment layers are used. A well-suited kind of alignment layers are photo-orientable Linearly Photopolymerisable Polymers (LPP). Backgrounds and manufacturing of such LPP/LCP devices are disclosed in, for example, U.S. Pat. No. 5,389,698, U.S. Pat. No. 5,602,661, EP-A-0 689 084, EP-A-0 689 065, WO 98/52077, WO 00/29878.

Conventional coating techniques such as spin-coating, slot-coating, meniscus-coating, bar-coating allow essentially a centralized mass production of optical structured devices based on the LPP/LCP technology.

However, using these coating techniques it is not possible to provide a practicable method for the manufacturing of personalized optical structured devices, i.e. the production in small quantities or as single items with an each time varying pattern structure, especially if the manufacturing in addition should be decentralized. Moreover, with these conventional coating techniques it is practically not possible to build up stacks of layers with a pattern structure of different alignments combined with topographically variations of the layer thickness—especially not for microscopic dimensions in the ranges below 300 micrometers.

A method according to the invention uses the characterizing features of the appended independent claims. An optical device manufactured according to one of these methods is additionally claimed, and an optical security device manufactured according to one of these methods is claimed. With the teaching of the invention it is advantageously possible to create single and personalized optical devices, especially security devices, in an easy to use and comparatively economical manner.

The method for manufacturing a structured optical device starts with a substrate, which is, at least in certain areas, prepared as an alignment layer for liquid crystals, on which is coated, again at least in certain areas, a layer comprising a cross-linkable liquid crystal material. One of these layers can be created as a coating using a conventional technique. The other layer, either in a first step the alignment layer or in a second step the layer comprising a cross-linkable liquid crystal material, is jet printed in order to create a patterned liquid crystal polymer network.

According to one preferred embodiment of the invention a patterned optical device is manufactured based on mono-axial aligned layers such as rubbed polyimide layers or mono-axially photo-oriented LPP layers which orient jet printed LCP layers according to the direction given by said alignment layers.

According to another embodiment of the invention a patterned optical device is manufactured based one jet printed photo-oriented LPP layers which orient later applied LCP layers according to the direction given by said alignment layers.

These optical devices can be applied, among others, in the fields of document security, such as passports, identification cards (ID cards), driver licenses or special certificates, etc. against falsification or alteration; however, the invention is not limited to such field.

It is advantageous that these devices can be manufactured with a jet printing technique. A jet printing technique can e.g. be based on piezo jet printing or bubble jet printing. Especially it is possible to use "ink-jet" printing techniques, largely used e.g. in today's computer print-outputs.

These and other objects, features and advantages of the invention will become more apparent in light of the following detailed description of embodiments thereof, as illustrated in the accompanying drawings, in which.

Figure 1:
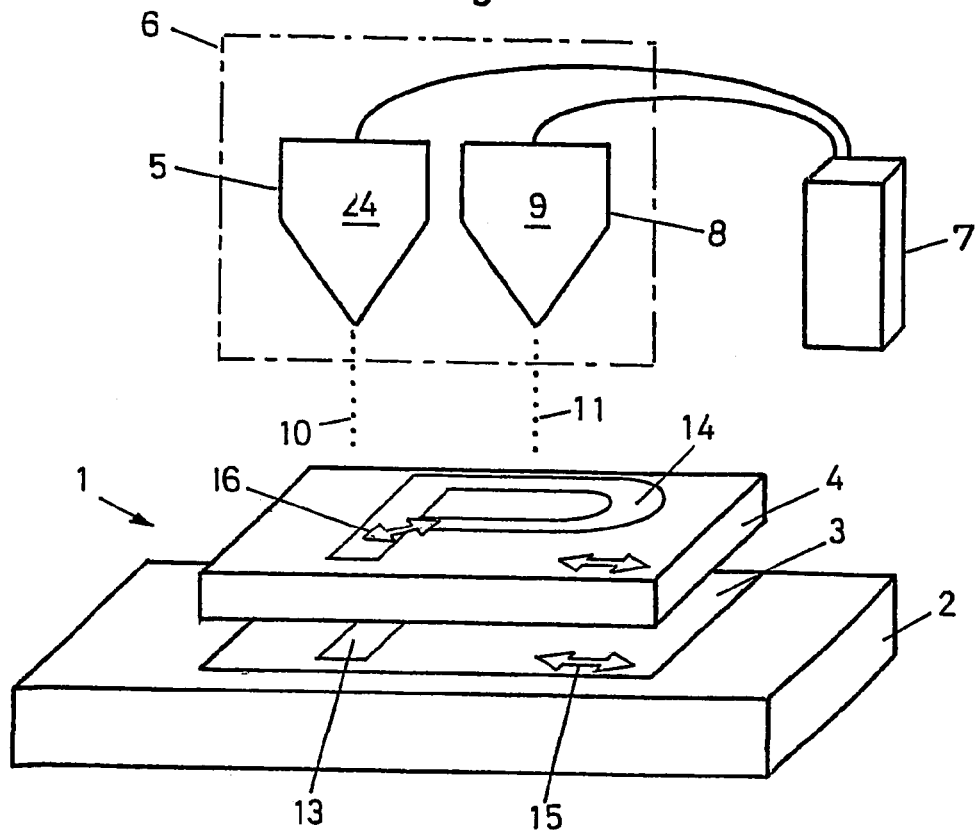
FIG. 1 is a schematic view of an LPP/LCP device made by jet-printing.

FIG. 1 is a schematic view of a structured LPP/LCP device 1 made by jet-printing. Such a device may for instance be used as a security device. The process is started with a substrate 2 onto which an alignment layer 3 is coated. The substrate 2 material can be for example plastic (e.g. polypropylene), the first alignment layer 3 may be an LPP layer. The linearly photopolymerisable polymers (LPP) are initially contained in a solution 24 which is stocked in a first container 5 being part of a cartridges and printing unit 6 of an ink-jet printer. Examples for such ink-jet printers are disclosed in, for example, U.S. Pat. No. 3,988,745, U.S. Pat. No. 4,385,304, U.S. Pat. No. 4,392,145, U.S. Pat. No. 3,747,120, U.S. Pat. No. 3,832,579, U.S. Pat. No. 3,683,212, U.S. Pat. No. 3,708,798, U.S. Pat. No. 4,660,058 and U.S. Pat. No. 5,754,198.

Line 10 shows schematically the droplets coating the substrate 2 and forming the alignment layer 3. After curing the first dried alignment layer 3, e.g. in the form of a LLP layer, the same solution 24 is used to form a second alignment layer 13, in this example shown in the form of the character "P" and having a different direction of orientation, e.g. with an different orientation indicated by the arrows 15 and 16.

Reference numeral 7 shows the control unit of the printer connected to the first container 5 and to a second container 8. The second container is filled with an LCP solution 9. Line 11 shows schematically the droplets coating the alignment layer 3 and forming the LCP layer 4 and 14.

Figure 2:
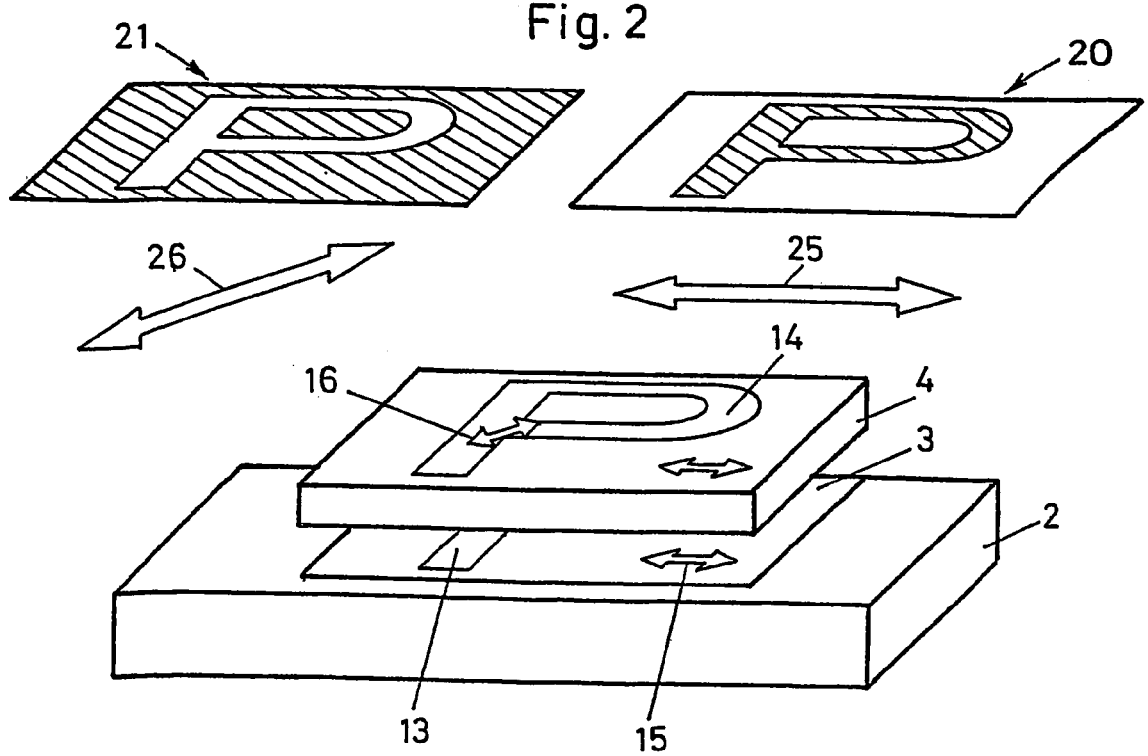
FIG. 2 is a schematic view of a reflective LPP/LCP device according to FIG. 1 with an appropriate inspection tool (polarizer) for viewing the information, here the character "P"

Further explanations will be given with reference to FIG. 2 showing schematically an image 20 or 21 of such an LPP/LCP device made with jet-printing. Same references always depict same features in the different Figures. Device 1 is a reflective LPP/LCP device according to FIG. 1 wherein the substrate 2 comprises a reflector (not explicitly shown). References 25 or 26 indicate an appropriate inspection tool, here a polarizer, for viewing the information, here the character "P". The polarizer 25 is orientated parallel to the orientation 15 of the alignment layer 3/LCP layer 4. The polarizer 26 is orientated parallel to the orientation 16 of the alignment layer 13/LCP layer 14. Therefore, polarizer 25 creates the image 20 of a dark "P" and polarizer 26 creates the image 21 of a bright "P" surrounded with a dark zone.

Figure 9:
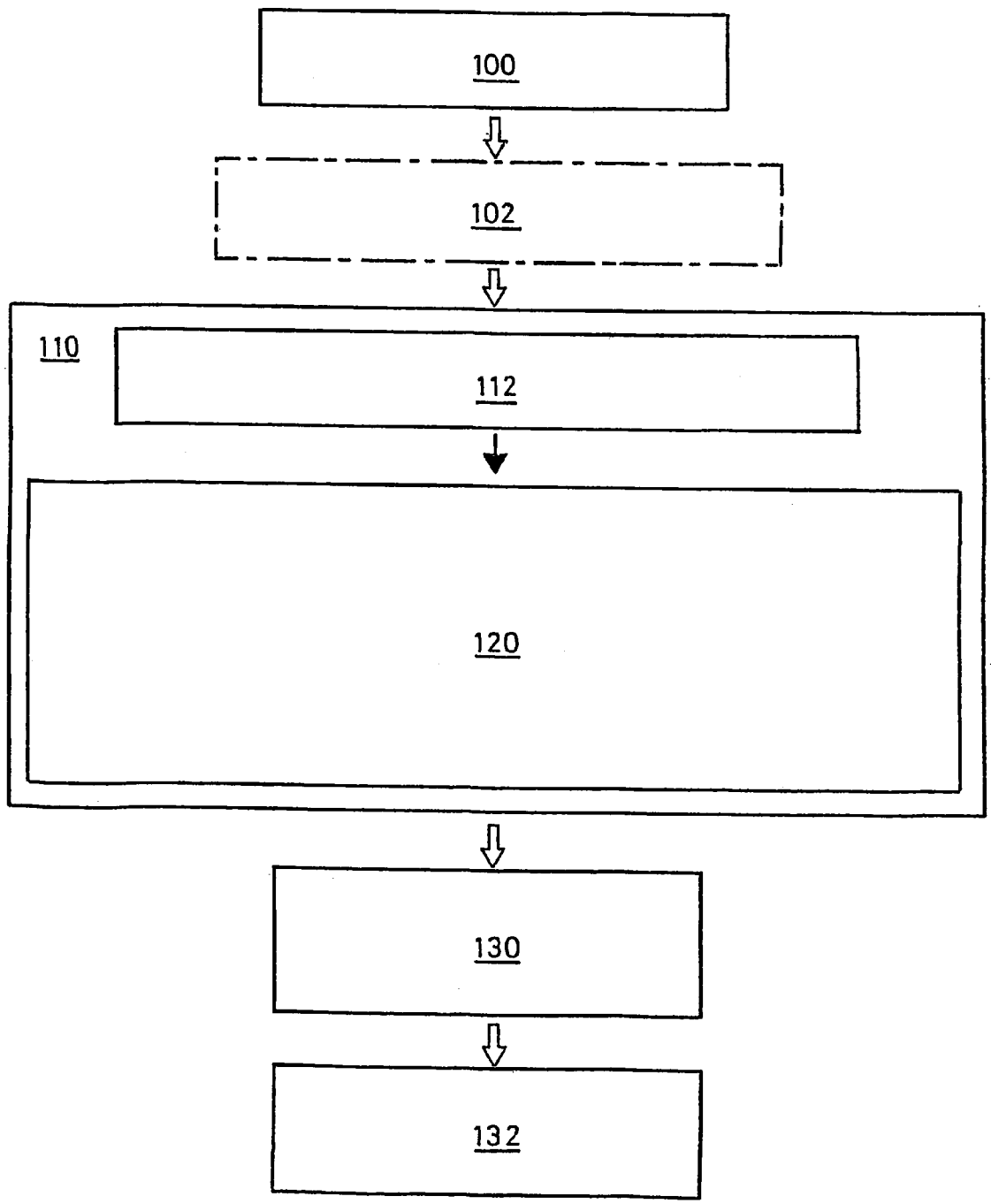
FIG. 9 is a schematic drawing of the process flow of the decentralized manufacturing of personalized optical security LPP/LCP devices through jet-printing.

The present invention describes a new technique of making LCP devices, which is based on jet printing. It advantageously allows the decentralized manufacturing of personalized such devices in a reliable and cost-effective manner. A specific flow diagram illustrating the decentralized manufacturing is depicted in FIG. 9. An example of a corresponding equipment is shown schematically in FIG. 10.

The personalization of optically structured security devices is an objective which particularly the document security manufacturers and users are asking for. Further, the combination of the decentralized manufacturing process together with the personalization of such optical security devices or other LCP and LPP/LCP devices not only opens possibilities in the field of document security but allows also to build up a plethora of other applications using different optical effects. The jet printing technique used may be 'drop on demand' methods or 'continues beam' methods.

The process flow of FIG. 9 shows a possible way of making in a decentralized equipment personalized optically structured devices for e.g. document security, i.e. to protect e.g. passports, identification cards, driver licenses or special certificates etc. against falsification or alteration. The personal data or other personal information as photographs are stored on a computer in a data base file 100. The data is transferred to the manufacturing equipment 110. It is possible and preferable to provide encoder means 102, encoding the data from the data base file 100, especially images or information for security documents such as passports, ID documents and others, through a security software before passing the information to the manufacturing equipment 110 to ensure that the optical device can be perused only with a suitable decrypting tool.

Manufacturing equipment 110 comprises cartridges 112 as shown in FIG. 9, containing suitable coating materials, e.g. the materials mentioned in the different embodiments in this description, and means 120 to perform jet printing of materials, drying same and cross-linking LCP layers if applicable with light, especially isotropic UV light. The simplicity of means 120 supports the possibility of decentralized production.

In a variation of the invention, it is possible to start with a substrate, e.g. self-adhesive labels, already bearing an alignment layer that was made in advance. In this case, the alignment layer may be of any kind (rubbed polyimide or LPP or others), and the personalized pattern structure is produced by suitably jet printing the LCP material.

Means 120 include printer means to operate the jet printer heads or cartridges which containing the LPP and LCP materials. Each single printer head will jet-print one specific material. In case of e.g. a four-head printer, four different materials may be jet-printed: e.g. the first head jet-prints a photo-orientable LPP material, the second head prints a LCP material, the third head prints a LCP material containing dichroic dyes, and the fourth head prints a cholesteric LCP material. Appropriate software will control the printing process.

The product 130 resulting from this method is a fully personalized optical security LCP device, ready to be applied. It can be used to produce security products 132 as passports, ID documents and others.

Figure 10:
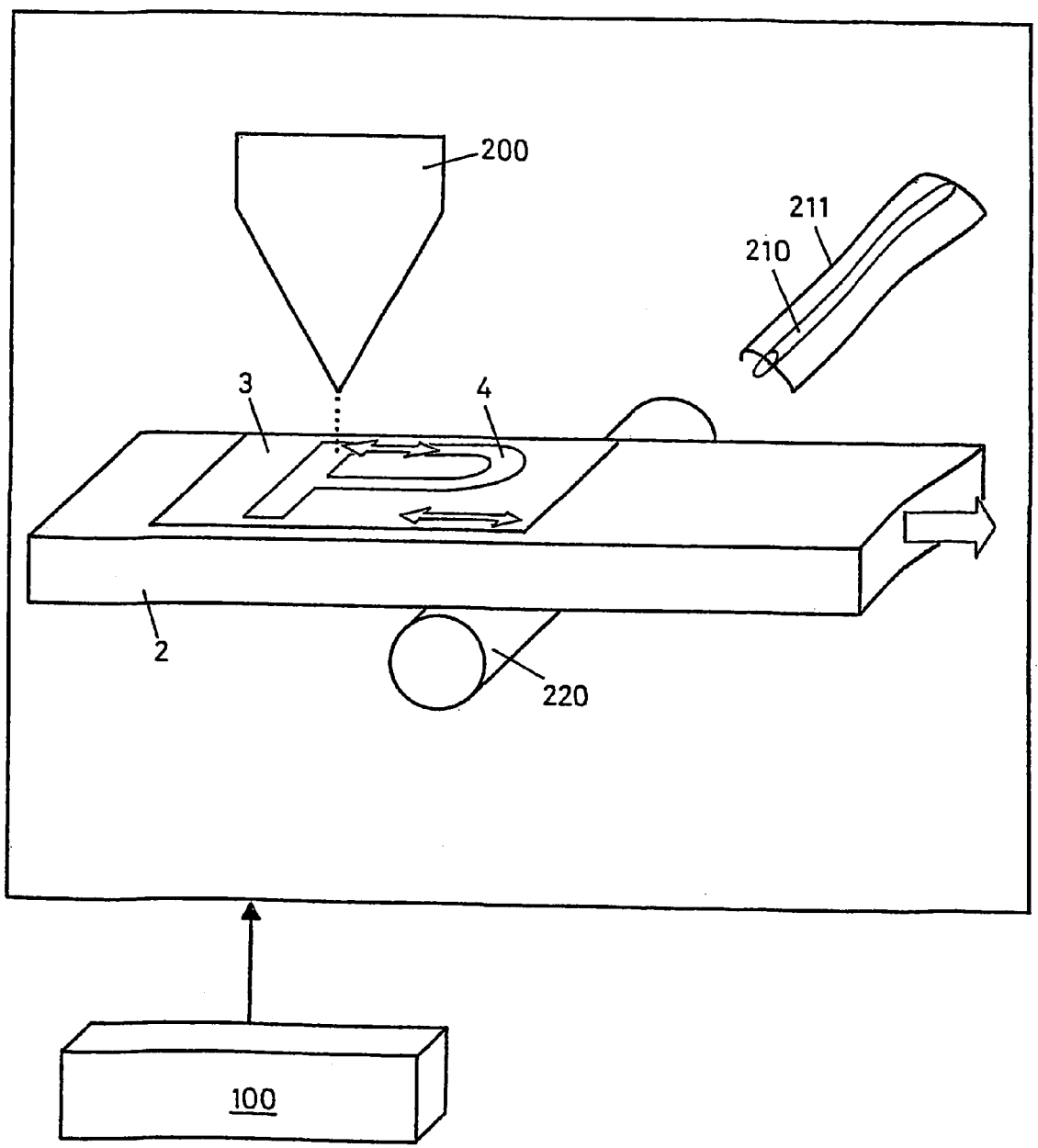
FIG. 10 is a schematic drawing of the process of decentralized manufacturing of personalized optical security devices including an LCP layer through jet-printing based on a optical security device described in the fourth embodiment.

FIG. 10 shows one example of an apparatus for manufacturing optical structured elements such as those described in embodiment 4. The apparatus consists essentially of a jet-printing head 200 and an isotropic UV lamp 210. A computer 100 controls the printing process onto e.g. sheets containing label substrates 2. The labels on the substrates 2 were previously coated with an alignment layer 3 (e.g. photo-aligned LPP or rubbed polyimide). The jet-printed LCP layer 4 forms a personalized pattern which—after a drying process through the heated cylinder 220—is finally cross-linked by the isotropic UV light under an inert atmosphere (e.g. under a nitrogen atmosphere). The UV light is generated by the isotropic UV lamp 210 comprising a reflector 211. This leads to a solid-state plastic film. The labels which contain the personalized optical security device may then be transferred to e.g. a passport or to other documents.

Figure 3A:
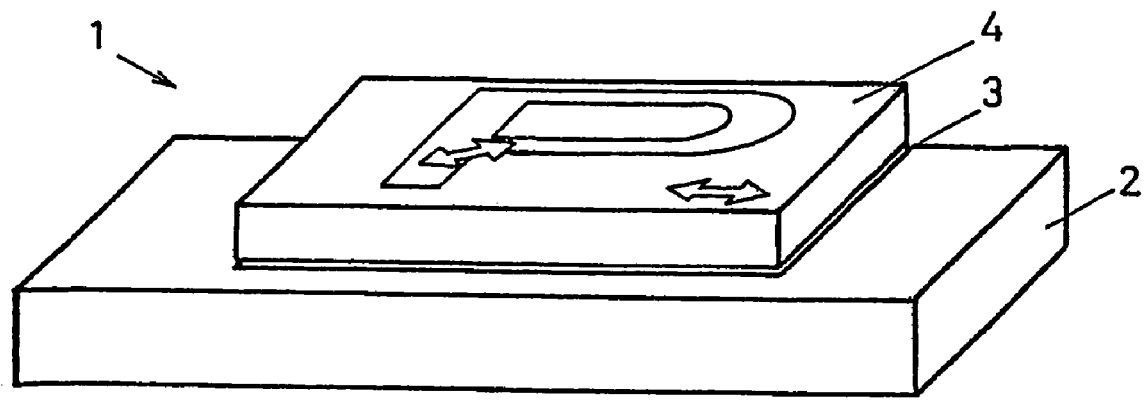
FIGS. 3a and 3b are schematic views of a modified form of the device shown in FIG. 2; the device depicted in FIG. 3 is described in the first embodiment.
Figure 3B:
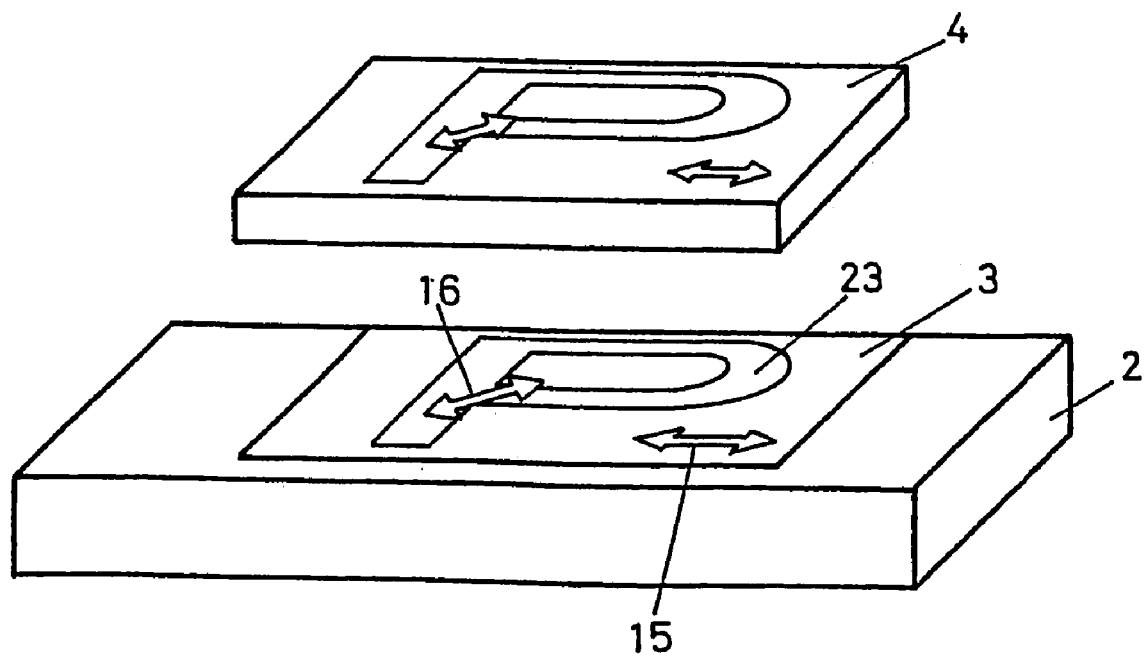

FIG. 3 shows schematically the set-up of a first embodiment of an optical device 1 according to the invention. FIG. 3a shows the order of the layers wherein FIG. 3b is an exploded view of FIG. 3a. The first alignment layer 3, e.g. as a LPP layer, is jet-printed on a substrate 2. The substrate material can be for example plastic (e.g. polypropylene) or paper, preferably specially treated paper such that the paper surface is smooth and compatible with the LPP or LCP (including dichroic LCP and cholesteric LCP) solutions (e.g. paper coated with a polyethylene layer). After the drying process the first alignment layer 3 is then exposed to linear polarized UV light as described below (the polarization direction 15 is say parallel to the long edge of the substrate 2 according to FIG. 3). Then, a second LPP layer 23 is jet-printed on top of the first LPP layer 3 having a different shape compared to the first alignment layer 3. In FIG. 3 the second LPP layer 23 has the shape of the character "P". After the drying process the second alignment layer 23 is then exposed to linear polarized UV light as described below (with a polarization direction 16 that is, for example, 45 degrees to the long edge of the substrate 2 according to FIG. 3).

This procedure leads to an alignment area which shows two different alignment capabilities: the area of first alignment layer 3 not covered by second alignment layer 23 has an alignment capability along the long edge of the substrate (direction 15 in FIG. 3), and the area of second alignment layer 23 (with the shape of "P") has an alignment capability of 45 degrees to first alignment layer 3 (direction 16 in FIG. 3).

In the next step, a LCP material is jet-printed as a layer 4 onto both alignment layers 3 and 23. When the solvent of the LCP material evaporates from the LCP solution, the liquid crystal molecules align according to the alignment information of the two alignment (LPP) layers 3 and 23. A crosslinkage as described below forms then a solid state plastic film. This terminates the manufacturing process of the optical structured LPP/LCP device 1.

The information (here the character "P") can be visualized with one or two linear polarizer(s), one polarizer for reflective devices, two polarizers for transmissive devices. By rotating the polarizer or the device 1, the image changes from positive to negative.

Figure 4A:
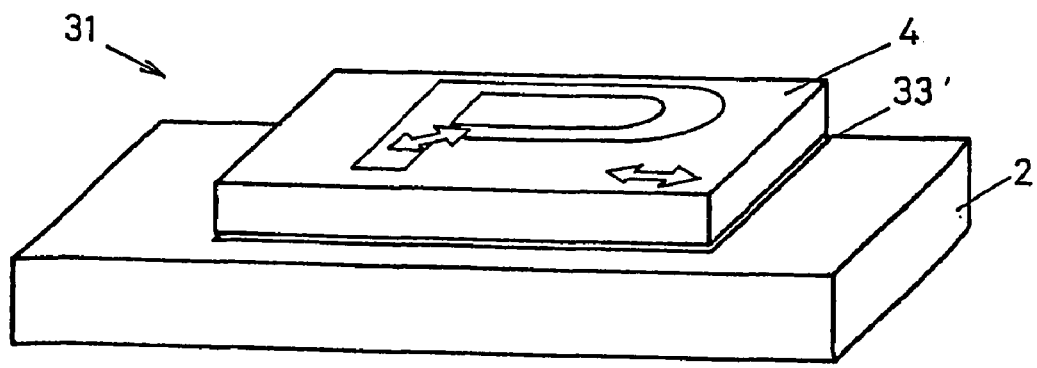
FIGS. 4a and 4b are schematic views of the preferred device described in the second embodiment.
Figure 4B:
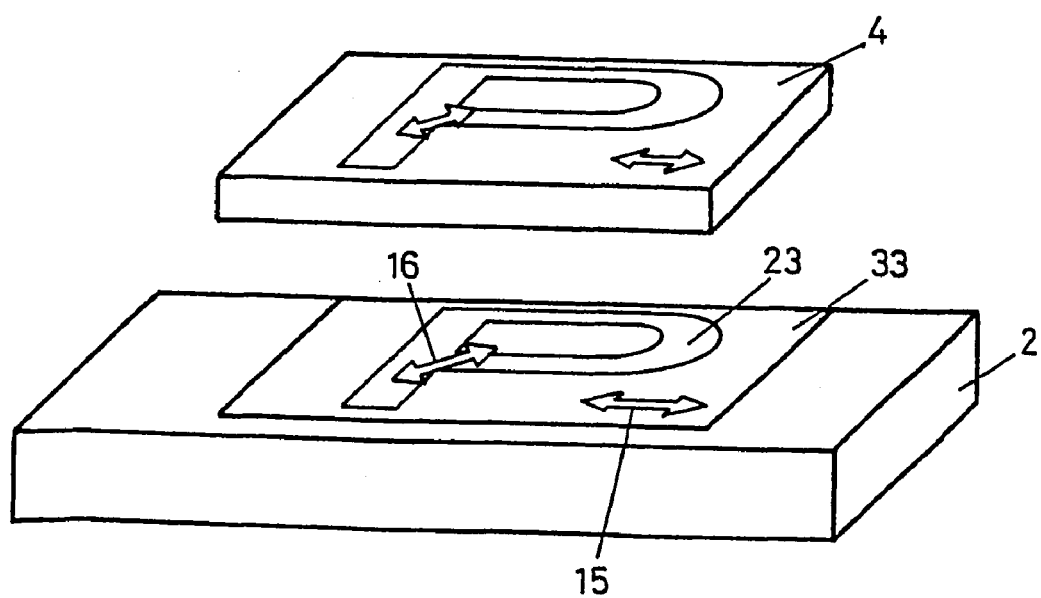

FIG. 4 shows schematically the set-up of a second embodiment of a device 31 according to the invention. FIG. 4*a* shows the order of the layers wherein FIG. 4*b* is an exploded view of FIG. 4*a*. The substrate 2 is already coated with a previously manufactured first alignment layer 33 having an alignment direction 15 along the long edge of the substrate in FIG. 4. The substrate 2 material can be chosen as in the first embodiment. It is possible that the first alignment layer 33 covers a definite area as shown in FIG. 4 or the first alignment layer 33 covers the whole substrate 2.

A second LPP layer 23 is jet-printed on top of the first alignment layer 33 having a different shape compared to the latter layer. In FIG. 4 the second LPP layer 23 has the shape of the character "P". After a drying process, the second layer 23 is then exposed to linear polarized UV light as described below (the polarization direction 16 is say 45 degrees to the long edge of the substrate 2 according to FIG. 4). This procedure leads to a an alignment area which shows—as in the case of the first embodiment—two different alignment capabilities: the area resulting, from the first alignment layer 33 not covered by the second alignment layer 23 has an alignment capability along the long edge of the substrate 2 (FIG. 4), and the second LPP layer 23 (having the shape of "P") has an alignment capability 45 degrees to first alignment layer 33.

In the next step, a LCP material is jet-printed as a layer 4 onto both alignment layers 23 and also onto the remaining area of the substrate 2 according to FIG. 5.T*his* specific area forms the LCP layer 4 shown in FIG. 5. When the solvent evaporated from the LCP solution, the liquid crystal molecules on top of the LPP layer 23 in the area 38 of the layer 4 align according to the alignment information 16 of the LPP layer 23. The remaining LCP area 39 of the layer 4 shows isotropic alignment. A cross-linkage as described below forms then a solid state plastic film. This terminates the manufacturing process of the optical structured LPP/LCP device 41. The information (the character "P")can be visualized with one or two linear polarizer(s), one polarizer for reflective devices, two polarizers for transmissive devices. By rotating the device the image changes—depending on the orientation of the polarizer—from positive to invisible or from negative to invisible depending on the acting mode which can be reflective or transmissible.

Figure 5A:
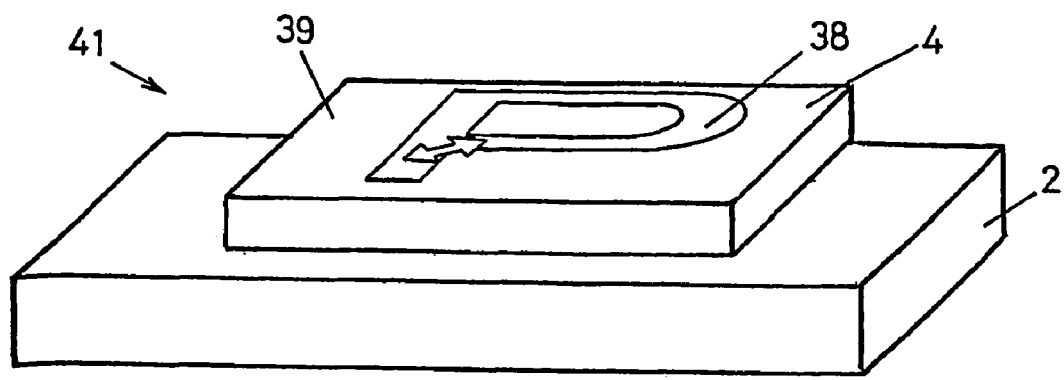
FIGS. 5a and 5b are schematic views of the preferred device described in the third embodiment.
Figure 5B:
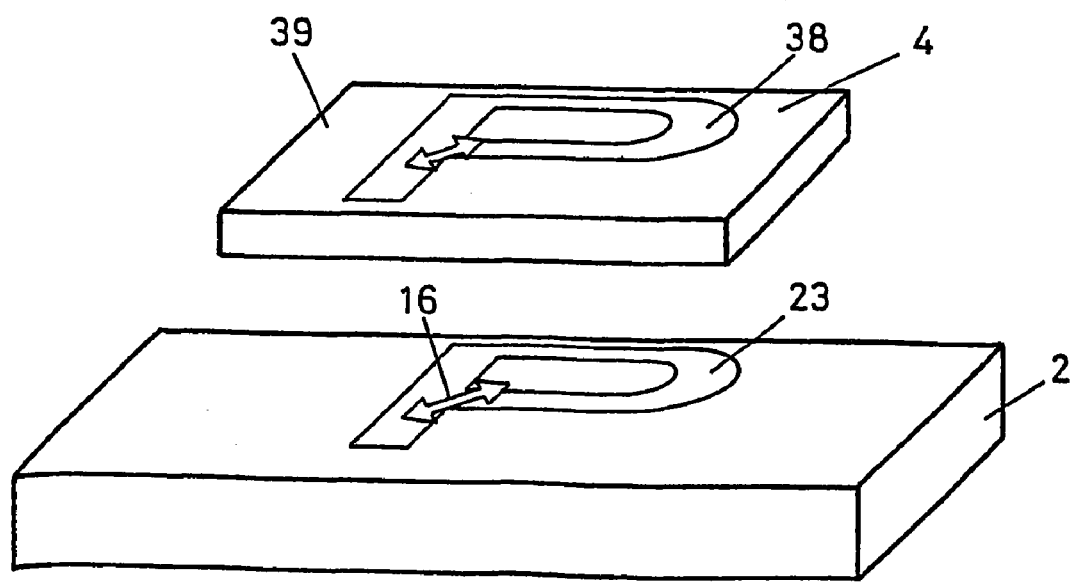

FIG. 5 shows schematically the set-up of a third embodiment of a device 41 according to the invention. FIG. 5*a* shows the order of the layers wherein FIG. 5*b* is an exploded view of FIG. 5*a*. A single LPP layer 23 is jet-printed on a substrate 2 and forms a pattern such as a picture, a graphic, or one or several alpha-numeric characters. In FIG. 5 the jet-printed LPP area forms e.g. the character "P". The substrate material can be chosen as in the first embodiment. After the drying process, the substrate including the LPP area 23 is then exposed to linear polarized UV light as described below (the polarization direction 16 is say 45° to the long edge of the substrate 2 according to FIG. 5). This procedure leads to a an area which shows two different alignment characteristics the section resulting from the jet-printed. LPP area 23 (LPP layer 23 described in the third embodiment has the shape of 'P') has an alignment capability of 45° to the long edge of the substrate (FIG. 5), the remaining area has no alignment information.

In the next step, the LCP material is jet-printed as a layer 4 onto the alignment layer 23 and also onto the remaining area of the substrate 2 according to FIG. 5. This specific area forms the LCP layer 4 shown in FIG. 5. When the solvent is evaporated from the LCP solution, the liquid crystal molecules on top of the LPP layer 23 align according to the alignment information 16 of the LPP layer 23. The remaining LCP area shows isotropic alignment. A cross-linkage as described below forms then a solid state plastic film. This terminates the manufacturing process of the optical structured LPP/LCP device 41. The information. (the character "P") can be visualized with one or two linear polarizer(s), one polarizer for reflective devices, two polarizers for transmissive devices. By rotating the device, the image changes—depending on the orientation of the polarizer— from positive to invisible or from negative to invisible depending on the acting mode which can be reflective or transmissible.

Figure 6A:
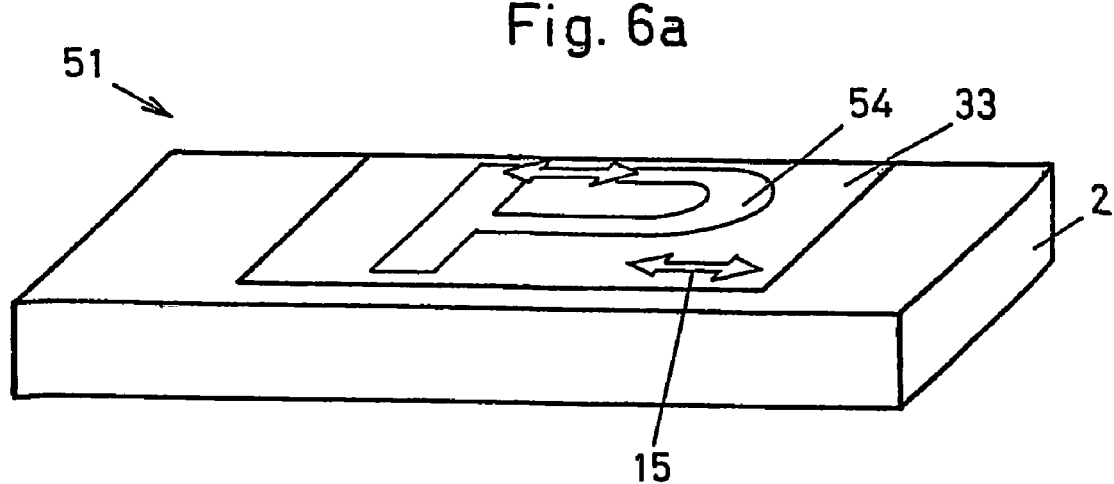
FIGS. 6a and 6b are schematic views of the preferred device described in the fourth embodiment.
Figure 6B:
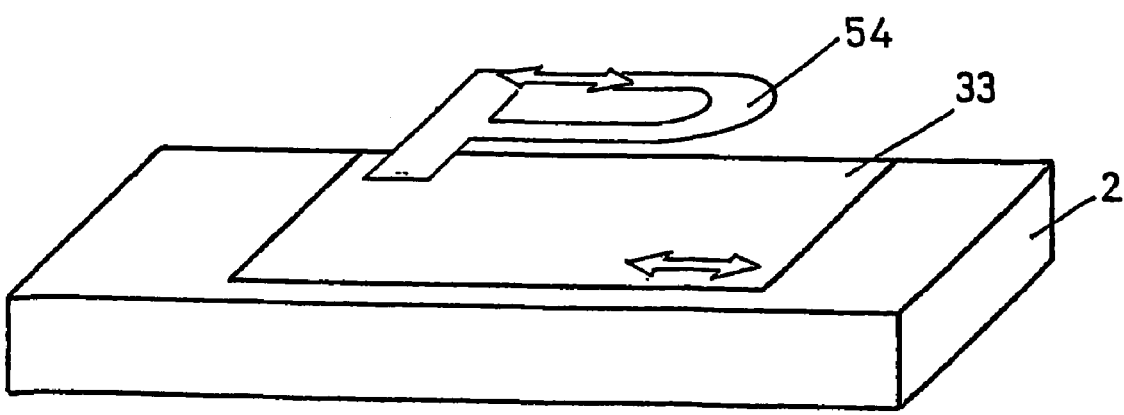

FIG. 6 shows schematically the set-up of a fourth embodiment of a device 51 according to the invention. FIG. 6*a* shows the order of the layers and FIG. 6*b* is an exploded view of FIG. 6*a*. In a first step an alignment layer 33 was applied to the substrate 2. The alignment layer may consist of a photo-orientable material such as an LPP material or of another alignment material such as rubbed polyimide or any other film or surface which is able to align liquid crystal molecules. The sole alignment layer 33 may be mono-axial as indicated in FIG. 6, but designs with more than one aligning direction are also possible. The substrate material can be chosen as in the first embodiment. The manufacturing of the alignment layer 33 can be done in advance and in a different place, that is, the substrates 2 including the alignment layer 33 may be pre-manufactured.

Then an LCP solution is jet-printed as a layer 54 onto that alignment layer 33 and forms a kind of information such as a picture, a graphical pattern, or one or several alphanumeric characters. In FIG. 6 the shape of the jet-printed LCP area 54 forms the character "P". When the solvent is evaporated from the LCP solution, the liquid crystal molecules on top of the alignment layer 33 align according to the alignment information 15 of said alignment layer 33. On the remaining alignment area no LCP is present. A cross-linkage as described below forms then a solid state plastic film. This terminates the manufacturing process of the optical structured device 51. The information (here the character "P") can be visualized with one or two linear polarizer(s), one polarizer for reflective devices, two polarizers for transmissive devices. By rotating the device the image changes— depending on the orientation of the polarizer—from positive to invisible or from negative to invisible depending on the acting mode.

Figure 7:
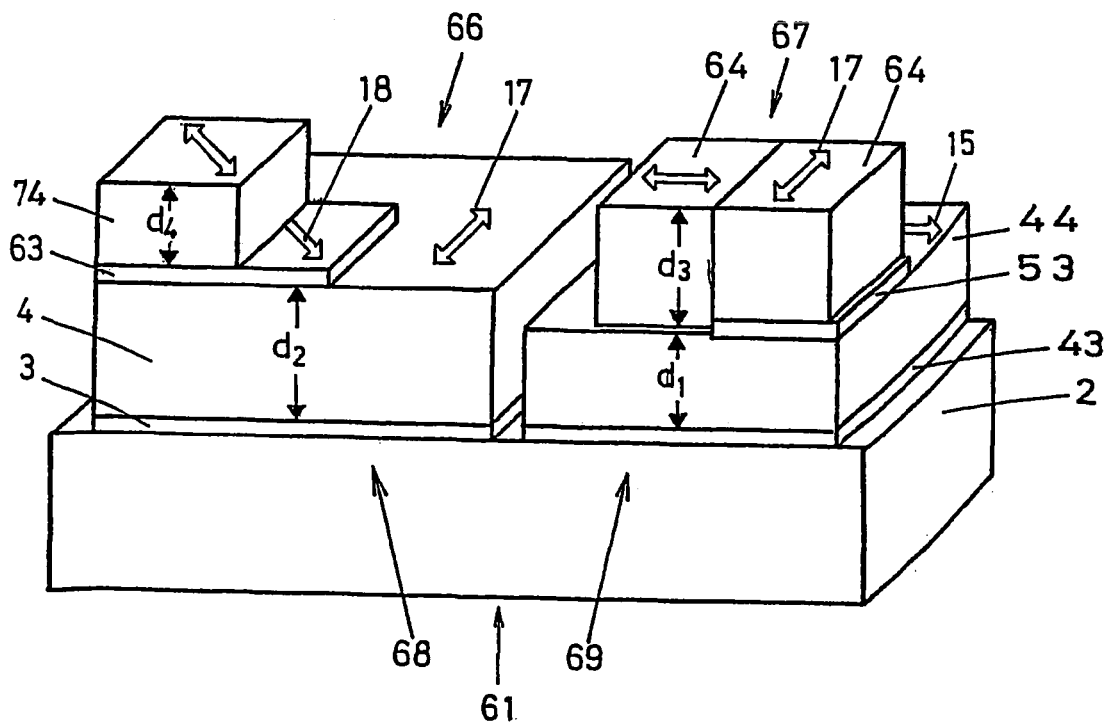
FIG. 7 is a plan view of a more complex LPP/LCP device described in the fifth embodiment.

FIG. 7 shows schematically the set-up of a fifth embodiment of a device 61 according to the invention which consists of a topographically complex orientation pattern including one (66) or several (67) LPP/LCP layers. In a fist step, a first alignment layer 3, in this case a LPP layer, is jet-printed on a certain area 68 of a substrate 2. The substrate material can be chosen as in the first embodiment. After the drying process, the first layer 3 is then exposed to linear polarized UV light as described below (the polarization direction 17 is for instance perpendicular to the long edge of the substrate 2). Then, a second LPP layer 43 is jet-printed on an area 69 of the substrate 2 different from the area 68 of the first alignment layer 3. The second LPP layer 43 may have a different shape compared to the first alignment (LPP) layer 3. After the drying process, the second LPP layer 43 is then exposed to linear polarized UV light as described below (the polarization direction 15 is for instance parallel to the long edge of the substrate 2).

Then, these two alignment (LPP) layers 3 and 43 are jet-printed with LCP material such that different thickness $d_2$ and $d_1$ of the LCP layers 4 and 44 result. When the solvent is evaporated from the LCP solution, the liquid crystal molecules align according to the alignment information of the two alignment (LPP) layers 3 and 43. A cross-linkage as described below then forms a solid state plastic film.

As shown in FIG. 7, on top of the LCP area 44 a further LPP layer is jet-printed to form the third LPP area 53. After the drying process, the third LPP layer 53 is then exposed to linear polarized UV light as described below (the polarization direction 17 is say perpendicular to the long edge of the substrate 2). Then, a further LPP layer 63 is jet-printed onto the LCP layer 4. The further LPP layer 63 may have a dfferent shape compared to the alignment (LPP) layers 3, 43 and 53. After the drying process, the further LPP layer 63 is then exposed to linear polarized UV light as described below (the polarization direction 18 is say 135 degrees to the long edge of the substrate 2). Then these two LPP layers 53 and 63, not contacting the substrate 2, are jet-printed with LCP material such that different thickness $d_3$ and $d_4$ of the LCP layers 64 and 74 result. When the solvent is evaporated from the LCP solution, the liquid crystal molecules align according to the alignment information of the two LPP layers 53 and 63 or—if no LPP layer is present as in area 67 —according the adjacent LCP layer 44 below. In FIG. 7, this happens with the left part of the LCP area 64. Normally, the LPP layer thickness (around 50 nm) is much smaller than the thickness of the optically active LCP layer. Thus, in FIG. 7 the thickness $d_3$ of the LCP layer 64 is depicted only with one thickness instead of correctly two. On the right side of area 68 there is no second LPP/LCP layer and therefore this area 66 consists of only one LPP/LCP layer. A cross-linkage as described below forms then a solid state plastic film. This terminates the manufacturing process of the optical structured LPP/LCP device 61. The information can be visualized with one or two linear polarizer(s), one polarizer for reflective devices, two polarizers for transmissive devices.

The optical devices 61 manufactured as shown in FIG. 7 and described above may show very complex color patterns. By rotating the polarizer or the device the image changes from positive to negative or from one color pattern to its complementary color counterpart. The process described in this embodiment allows the manufacturing of complex optical devices such as e.g. sophisticated optical structured security elements or specific interference color filters.

Figure 8:
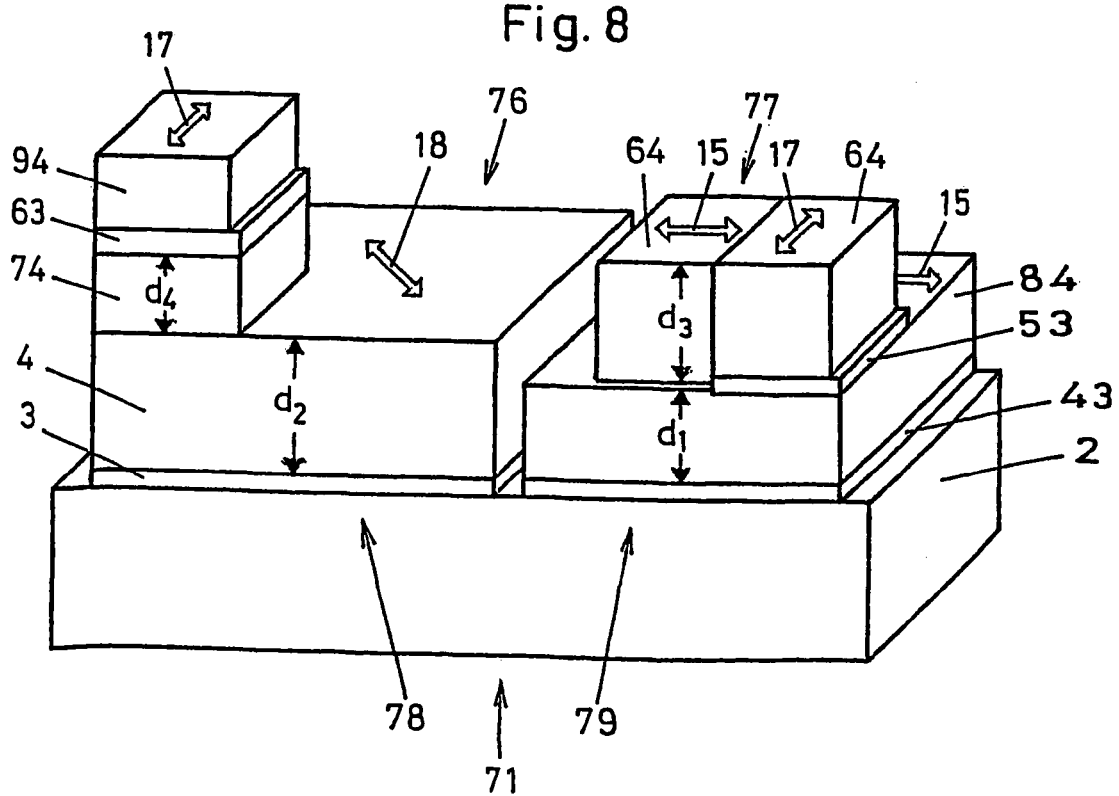
FIG. 8 is a plan view of a more complex LPP/LCP device including not only LPP/LCP retarder layers but also a cholesteric filter and a dichroic LCP layer; this device is described in the sixth embodiment.

FIG. 8 shows schematically the set-up of a sixth embodiment which consists of a topographically complex orientation pattern including one (76) or more (77) LPP/LCP layers combined with dichroic and/or cholesteric liquid crystal layers. In a first step, a first alignment (LPP) layer 3 is jet-printed on a substrate 2. The substrate material can be chosen as in the first embodiment. In case of cholesteric layers, a light absorbing dark background leads to better reflective properties for one mode of circularly polarized light, whereas the other mode is substantially absorbed. After the drying process, the first layer 3 is exposed to linear polarized UV light as described below (the polarization direction 18 is say 135 degrees to the long edge of the substrate 2). Then, a second LPP layer 43 is jet-printed beside the first alignment layer 3. The second LPP layer 43 may have a different shape compared to the first alignment (LPP) layer 3. After the drying process, the second LPP layer 43 is then exposed to linear polarized UV light as described below (the polarization direction 15 is say parallel to the long edge of the substrate 2). Then, these two alignment (LPP) layers 3 and 43 are jet-printed with LCP material such that different thicknesses $d_1$ and $d_2$ of the LCP layers 84 and 4 result. According to FIG. 8, the LCP layer 84 is a dichroic layer, which means that the LCP layer 84 contains dichroic dyes as described below. The dichroic dyes may be cross-linkable. When the solvent is evaporated from the LCP solution, the liquid crystal molecules align according to the alignment information of the two alignment (LPP) layers 3 and 43. A cross-linkage as described below forms then a solid state plastic film.

As shown in FIG. 8, on top of the LCP area 84 further LPP material is jet-printed to form the LPP area 53. After the drying process, the LPP layer 53 is exposed to linear polarized UV light as described below (the polarization direction 17 is say perpendicular to the long edge of the substrate 2). Then, the LPP layer 53 and part of the LCP layers 4 and 84 are jet-printed with LCP material such that different thicknesses $d_3$ and $d_4$ of LCP layers 64 and 74 result. According to FIG. 8, the LCP layer 74 consists of a cholesteric liquid crystal layer with a specific pitch. The manufacturing process of such a cholesteric layer is described below. When the solvent is evaporated from the LCP solutions, the liquid crystal molecules align according to the alignment information of the LPP layer 53 or—if no LPP layer is present as on LCP layer 4 and on LCP layer 84 in ar a 77—according to the adjacent LCP layer 84 below. Normally, the LPP layer thickness (around 50 nm) is much smaller than the thickness of the optically active LCP layer. Thus, in FIG. 8 the thickness $d_3$, of the LCP layer 64 is depicted only with one thickness instead of correctly two. A cross-linkage as described below forms then a solid state plastic film. Then, a further LPP layer 63 is jet-printed onto the cholesteric LCP layer 74 and, after drying, exposed to linear polarized UV light (with the polarization direction 17 perpendicular to the long edge of the substrate 2). The LPP layer 63 is then jet-printed with LCP material to form an LCP layer 94. A cross-linkage as described below then forms a solid state plastic film. This terminates the manufacturing process of the optical structured LPP/LCP device 71.

The complex information can be visualized with one or two linear polarizer(s), one polarizer for reflective devices, two polarizers for transmissive devices. The optical devices 71 described in this embodiment may show very complex color patterns. By rotating the polarizer or the device the image changes from positive to negative or from one color pattern to its complementary color counterpart. The process described in this embodiment again shows the possibility of manufacturing complex and sophisticated optical devices.

For the production of the LPP layers, suitable LPP materials are known to a person skilled in the art. Examples are for instance described in patent publications EP-A-0 611 786, WO-96/10049 and EP-A-0 763 552. They include cinnamic acid derivatives and ferulic acid derivatives. For the examples described above, the following LPP material

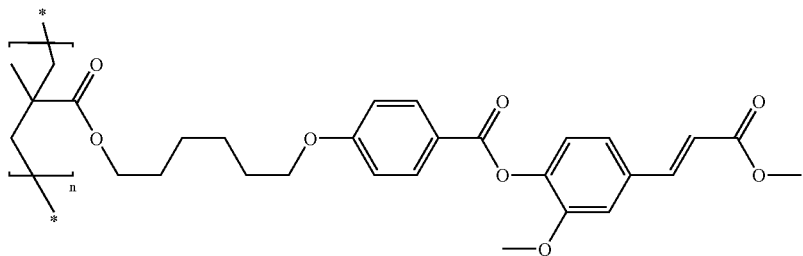

was used as a 10 percent solution in a solvent mixture of MEK (methyl-ethyl ketone) and ethyl acetate (ratio MEK:ethyl acetate=1:1). The viscosity was between 2 and 4 mPas. Depending on the type of ink-jet printing head used also higher viscosity up to about 80 cP are possible. The layers were exposed to linearly polarized light from a mercury high-pressure lamp for 10 to 550 seconds (depending on the strength of the lamp and on the characteristics of LPP and LCP layers) at room temperature.

For the production of the LCP layers in the examples the following cross-linkable liquid crystal diacrylate components in MEK. If required, well-known additives may also be present, such as e.g. phenol derivatives for stabilisation or photoinitiators like Irgacure®. By means of varying the concentration, it was possible to adjust the LCP layer thickness over a wide range leading to different optical retardations (e.g. about $\lambda/4$ to $\lambda/2$ for almost black and white devices for reflective mode or transmissive mode respectively) of the LCP retarder layers. For cross-linking the liquid crystal monomers, the layers were exposed to isotropic light from a xenon lamp in an inert atmosphere.

For the production of the dichroic LCP layers, the nematic mixture of cross-linkable liquid crystal diacrylate components as described above was used, additionally containing

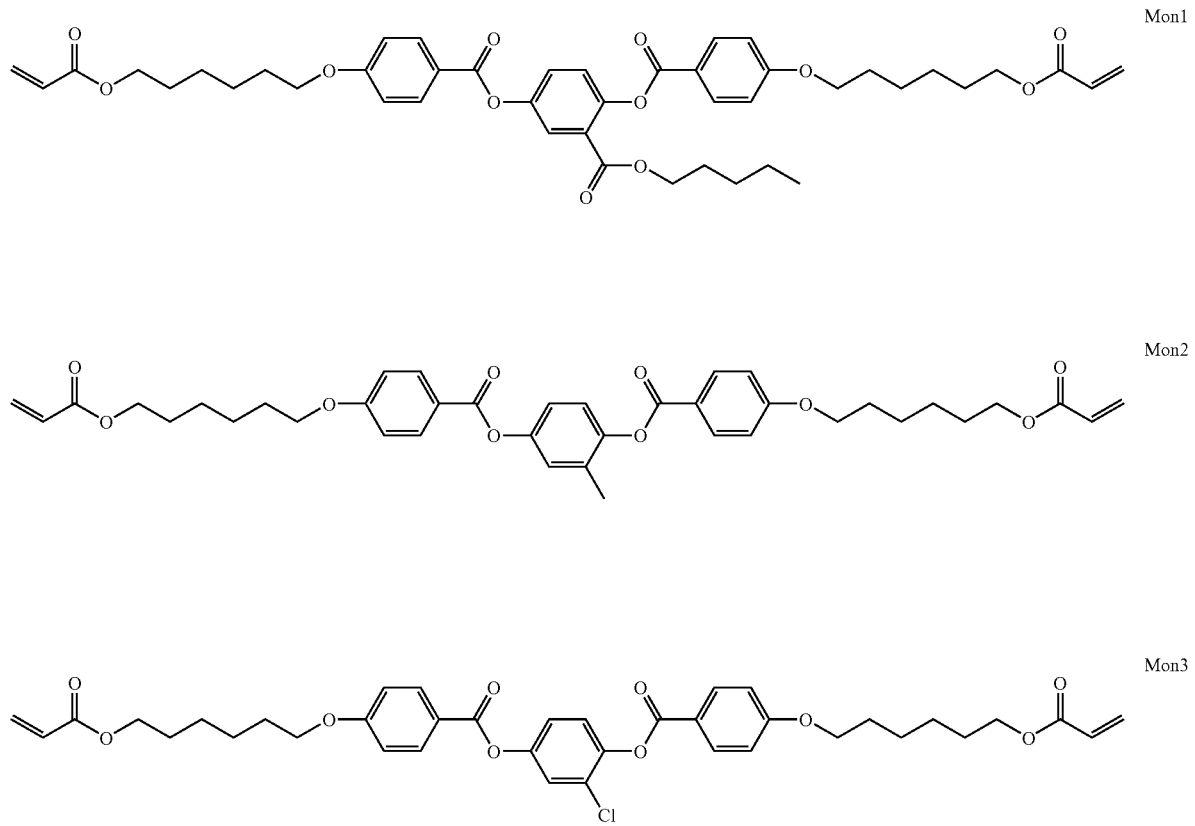

were used in a supercoolable nematic mixture (Mon1 80%, Mon2 15%, Mon3 5%) having a particularly low melting point (Tm~35° C.) thus making it possible to prepare the LCP layer at room temperature. The mixture was dissolved one or more dichroic dyes. As dichroic dyes, the mixture contained for instance a blue antraquinone dye B3 and a red azo dye R4 (structures see below) in concentration 2 weight % and 1 weight % respectively.

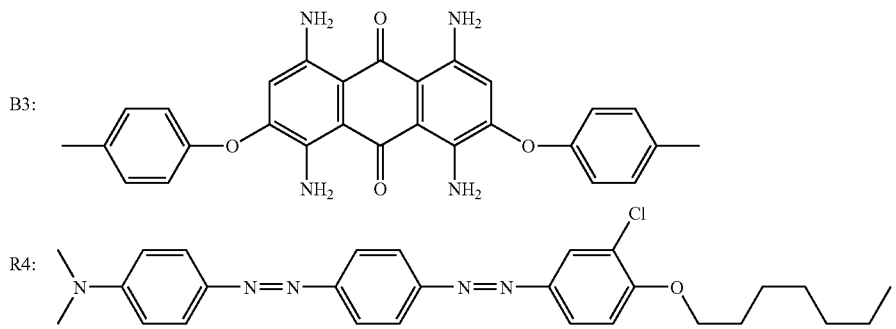

By means of varying the concentration in a solvent such as MEK, it was possible to adjust the LCP layer thickness over a wide range leading to different extinction values of the dichroic polarizer.

For the production of the cholesteric LCP layers, a procedure similar to that of the nematic LCP layer was used. However, the nematic mixture was additionally doped with cholesteric material inducing a pitch. A suitable chiral dopant was e.g. ST31L which shows a left-handed helical sense.

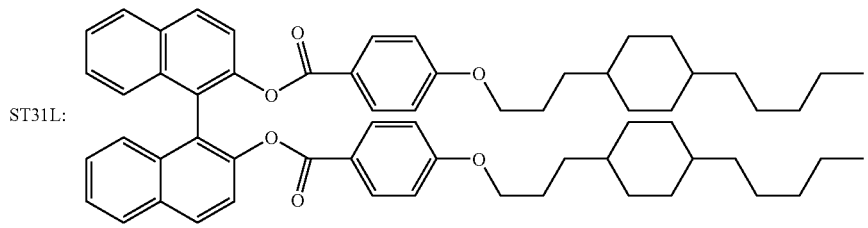

The concentration of the chiral dopant was 4% to 9%, more preferable 5% to 6%. This induces the desired reflective wavelength band in the visible range, but by changing the concentration also reflective wavelength bands in the UV or IR range can be realized. By means of varying the concentration in a solvent such as MEK, it was possible to adjust the cholesteric LCP layer thickness over a wide range leading to different reflection properties. The thickness of the cholesteric layer was 1 to 10 micrometers, depending on the wavelength range intended.

The optical effects described above, as well as the corresponding layer structures and material compositions, represent only some of many possibilities according to the invention. They may in particular be combined in a wide variety of ways, which will be especially advantageous for the development and application of authenticating elements. Of course, any other kind of birefringent layer than the LCP layer described may also be used to produce an optical effect that can be employed in optical devices.

It is furthermore possible for the examples described above, to use not an LPP alignment layer but a different alignment layer which, according to the desired optical property and resolution, has the same or similar properties to an LPP layer. It is also conceivable to produce the orientation required for a retarder layer using a correspondingly structured substrate. A structured substrate of this type can, for example, be produced by embossing, etching and scratching.

The invention claimed is:

1. A method for manufacturing a liquid crystal polymer network having a pattern structure, comprising:
   providing a substrate;
   jet printing a first alignment layer, which comprises a material to which an aligning property can be imparted by exposure to polarized light, in a first pattern onto the substrate;
   exposing the first alignment layer to a first polarized light;
   coating the substrate bearing the alignment layer with a first layer comprising a cross-linkable liquid crystal material;
   allowing the liquid crystal material to align; and
   cross-linking the liquid crystal material.

2. A method according to claim 1, further comprising:
   jet printing a second alignment layer, which comprises a material to which an aligning property can be imparted by exposure to polarized light, in a second pattern on or adjacent to the first alignment layer; and
   exposing the second alignment layer to a second polarized light having a polarization different from the first polarized light.

3. A method according to claim 1, wherein the first alignment layer covers a first area creating an image element and wherein the first layer comprising a cross-linkable liquid crystal material covers a second area including at least said image element.

4. A method according to claim 2, further comprising:
   jet printing at least one further alignment layer in at least one further pattern adjacent the first and the second alignment layers; and
   exposing the at least one further alignment layer to a further polarized light.

5. A method according claim 4, wherein data representing the first, second, and further patterns are stored in a memory of a computer system and wherein the computer system controls jet printing of the alignment layer and wherein the computer system further controls coating of the cross-linkable liquid crystal onto the substrate.

6. A method according to claim 4, wherein at least one of the first, second, and further alignment layers comprises a layer containing a linearly photopolymerisable material.

7. A method according to claim 4, wherein the first, second, and further polarized lights to which the first, second, and further alignment layers are exposed is selected from one of linearly and elliptically polarized.

8. A method according to claim 1, wherein the jet printing is selected from one of a piezo jet printing method and a bubble jet printing method.

9. An optical device comprising a liquid crystal polymer network having a pattern structure manufactured according to claim 1.

10. An optical device according to claim 9, which is an optical security device.

11. A method according to claim 1, wherein at least one layer comprising a cross-linkable liquid crystal material further comprises at least one dichroic dye.

12. A method for manufacturing a liquid crystal polymer network having a pattern structure, comprising:
providing a substrate comprising a first alignment layer;
jet printing a first layer comprising a cross-linkable liquid crystal material in a first pattern;
allowing the liquid crystal material to align; and
cross-linking the liquid crystal material.

13. A method according to claim 12, wherein the first alignment layer comprises at least a second pattern.

14. A method according to claim 12, further comprising:
producing the first alignment layer by one of embossing, etching, and scratching.

15. A method according to claim 12, further comprising:
jet printing a second alignment layer, which comprises a material to which an aligning property can be imparted by exposure to polarized light, in a second pattern on or adjacent to the first alignment layer; and
exposing the second alignment layer to a polarized light such that the second alignment layer is oriented in a direction different to the orientation of the first alignment layer.

16. A method according to claim 12, wherein at least two additional layers comprising a cross-linkable liquid crystal material are jet printed adjacent to each other.

17. A method according to claim 12, further comprising:
jet printing at least one further alignment layer, which comprise a material to which an aligning property can be imparted by exposure to polarized light, on at least one of the already existing layers comprising a cross-linkable liquid crystal material;
exposing the at least one further alignment layer to polarized light;
jet printing at least one further layer comprising a cross-linkable liquid crystal material; and
cross-linking the at least one further layer comprising a cross-linkable liquid crystal material.

18. A method according to claim 12, wherein the first alignment layer covers an area creating an image element and wherein the first layer comprising a cross-linkable liquid crystal material covers a second area encompassing at least said image element.

19. A method according to claim 12, wherein the first layer comprising a cross-linkable liquid crystal material covers an area creating an image element on the first alignment layer covering a bigger area encompassing at least said image element.

20. A method according to claim 13, wherein data representing the first and at least second patterns are stored in a memory of a computer system and wherein the computer system controls the jet printing of the cross-linkable liquid crystal material.

21. A method according to claim 15, wherein at least one alignment layer comprises a layer containing a linearly photopolymerisable material.

22. A method according to claim 15, wherein the first and the second polarized light are selected from one of linearly and elliptically polarized light.

23. A method according to claim 12, wherein at least one layer comprising a cross-linkable liquid crystal material further comprises at least one dichroic dye.

24. A method according to claim 12, wherein the jet printing is selected from a piezo jet printing method and a bubble jet printing method.

25. An optical device comprising a liquid crystal polymer network having a pattern structure manufactured according to claim 12.

26. An optical device according to claim 25, which is an optical security device.

* * * * *